(12) United States Patent
Greenberg et al.

(10) Patent No.: US 11,866,294 B2
(45) Date of Patent: Jan. 9, 2024

(54) AIR OPERATED HOSE REAL

(71) Applicants: Nate Greenberg, Suffern, NY (US); Evan S. Greenberg, Lake Hopatcong, NJ (US)

(72) Inventors: Nate Greenberg, Suffern, NY (US); Evan S. Greenberg, Lake Hopatcong, NJ (US)

( * ) Notice: Subject to any disclaimer, the term of this patent is extended or adjusted under 35 U.S.C. 154(b) by 6 days.

(21) Appl. No.: 17/698,810

(22) Filed: Mar. 18, 2022

(65) Prior Publication Data
US 2022/0297974 A1    Sep. 22, 2022

Related U.S. Application Data

(60) Provisional application No. 63/207,751, filed on Mar. 19, 2021.

(51) Int. Cl.
| | | |
|---|---|---|
| *B65H 75/44* | (2006.01) | |
| *B60P 3/22* | (2006.01) | |
| *B65H 75/42* | (2006.01) | |

(52) U.S. Cl.
CPC ........ *B65H 75/4489* (2013.01); *B60P 3/2265* (2013.01); *B65H 75/4478* (2013.01); *B65H 75/425* (2013.01)

(58) Field of Classification Search
CPC .............. B65H 75/425; B65H 75/4478; B65H 75/4489
See application file for complete search history.

(56) References Cited

U.S. PATENT DOCUMENTS

| 2,514,862 | A |   | 7/1950  | Hannay |                         |
|-----------|---|---|---------|--------|-------------------------|
| 2,612,326 | A |   | 9/1952  | Schweisthal |                   |
| 2,623,707 | A | * | 12/1952 | Cook ................. | B65H 75/4489 |
|           |   |   |         |        | 137/355.2               |
| 4,649,954 | A | * | 3/1987  | Dunwoody .......... | B65H 75/403 |
|           |   |   |         |        | 137/355.27              |
| 5,531,246 | A | * | 7/1996  | Ritter ................. | B65H 75/4489 |
|           |   |   |         |        | 137/355.16              |

(Continued)

FOREIGN PATENT DOCUMENTS

DE    19839437 A1    3/1999

OTHER PUBLICATIONS

"Air Driven Hose Reel, 3,000 psi, Hose Capacity 100 ft (1/2 in ID)" Web page <https://www.grainger.com/product/COXREELS Air-Driven-Hose-Reel-33N107>, 1 page, Dec. 29, 2021.

(Continued)

*Primary Examiner* — Kevin F Murphy
(74) *Attorney, Agent, or Firm* — Locke Lord LLP; Daniel J. Fiorello; Gabrielle L. Gelozin

(57) ABSTRACT

In accordance with at least one aspect of this disclosure, a retractable hose reel system includes a reel configured to rotate about a shaft, a fluid driven motor configured to drive the reel, a fluid connector configured to connect to a fluid source to power the fluid motor, and a fluid line connecting between the fluid connector and the fluid motor to supply fluid from the fluid source to the fluid motor to power the fluid motor. A valve is disposed in the fluid line, configured to move between an open position and a closed position, where in the open position the valve allows fluid flow to the fluid motor and in the closed position the valve prevents fluid flow to the fluid motor.

18 Claims, 2 Drawing Sheets

(56) References Cited

U.S. PATENT DOCUMENTS

| | | | |
|---|---|---|---|
| 6,994,105 B1 * | 2/2006 | Chen .................. | B65H 75/4471 |
| | | | 242/405 |
| 8,490,644 B2 * | 7/2013 | Strachan ............ | B65H 75/4489 |
| | | | 137/355.16 |
| 9,352,933 B2 | 5/2016 | Moore et al. | |

OTHER PUBLICATIONS

"7000 Hannay Air Powered Rewind Dual Hose Reel" Web page <https://hosewarehouse.com/products/7000-air-powered-rewind-dual-hose-reel-a-7032-25-26>, 1 page, Dec. 29, 2021.

* cited by examiner

AIR OPERATED HOSE REAL

CROSS-REFERENCE TO RELATED APPLICATIONS

This application claims priority to and the benefit of U.S. Provisional Application No. 63/207,751, filed Mar. 19, 2021, the entire content of which is incorporated herein by reference.

TECHNICAL FIELD

The present disclosure relates to hose reels, and more particularly to air operated hose reels.

BACKGROUND

Typical hose reels can be difficult to operate because they often require to be manually wound via a crank. This can be physically difficult for a user, in particular if the hose is long and heavy. Other powered hose reels often require electrical power or a source of hydraulic fluid, or sometimes both. These additional connections and fluids may not be available at a job site, or if stored in a work truck, they make take up valuable space that could be used for additional tools, or larger fluid supplies to supply the hose.

There remains a need in the art for a powered hose reel that is physically easy for a user to operate and does not require additional fluids or connections outside of what is required for supplying fluid to the hose. This disclosure provides a solution for this need.

SUMMARY

In accordance with at least one aspect of this disclosure, a retractable hose reel system can a reel configured to rotate about a shaft, a fluid driven motor configured to drive the reel, a fluid connector configured to connect to a fluid source to power the fluid motor, and a fluid line connecting between the fluid connector and the fluid motor to supply fluid from the fluid source to the fluid motor to power the fluid motor. A valve is disposed in the fluid line between the fluid connector and the fluid motor, configured to move between an open position and a closed position, where in the open position the valve allows fluid flow to the fluid motor and in the closed position the valve prevents fluid flow to the fluid motor.

A pressure reducing valve can be disposed in the fluid line upstream of the fluid motor configured to reduce a pressure of the fluid in the fluid line at the fluid motor. An activator switch can be operatively connected to the valve such that the valve position is controlled by actuation of the activator switch. In certain embodiments, the activator switch can be a manual control switch configured to be actuated by a user.

In embodiments, the fluid line can be configured to provide fluid flow from the fluid source up to the valve upon connection of the fluid connector to the fluid source regardless of the status of the activator switch. In certain embodiments, the fluid connector can include a quick connect connector.

A lubrication port can be disposed in the fluid line downstream of the pressure reducing valve configured to provide lubricating fluid to one or more of the valve and/or the fluid motor. In certain embodiments, the fluid line can include one or more elbow and/or T connectors. In certain embodiments, one of the T connectors can be configured to split flow in the fluid line upstream of the pressure reducing valve to provide unreduced pressure flow to the hose while providing reduced pressure to the fluid motor. In embodiments, one of the T connectors can be disposed in the fluid line between the fluid connector and the pressure reducing valve configured to connect one or more additional retractable hose reel systems to the fluid line such that all retractable hose reel systems can be fed and powered by the fluid source.

In certain embodiments, the fluid motor can include an air motor. In certain embodiments, the air motor can be entirely air driven. In certain embodiments, the system can be entirely mechanically operated (e.g. where there are no electrical connections). In embodiments, the reel can further include one or more mounting apertures configured to accept a respective mounting fastener to mount the reel to a vehicle. In certain embodiments, the reel further includes one or more mounting apertures configured to accept a respective mounting fastener to mount the reel to a structure.

In accordance with at least one aspect of this disclosure, a kit can include a retractable, air driven hose reel and a hose wound around the reel. In embodiments, the air driven hose reel is the retractable hose reel as described hereinabove.

In embodiments, the kit can include about 200 feet to about 600 feet of hose and the hose can have an inner diameter of about 0.25 inches to about 1 inch. In certain embodiments, the kit can include about 300 feet of hose and the hose can have an inner diameter of about 0.5 inches. In embodiments, the kit can be configured to be mounted to a structure or a vehicle. In certain embodiments, the kit can include the fluid source for powering the retractable, air driven hose reel.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
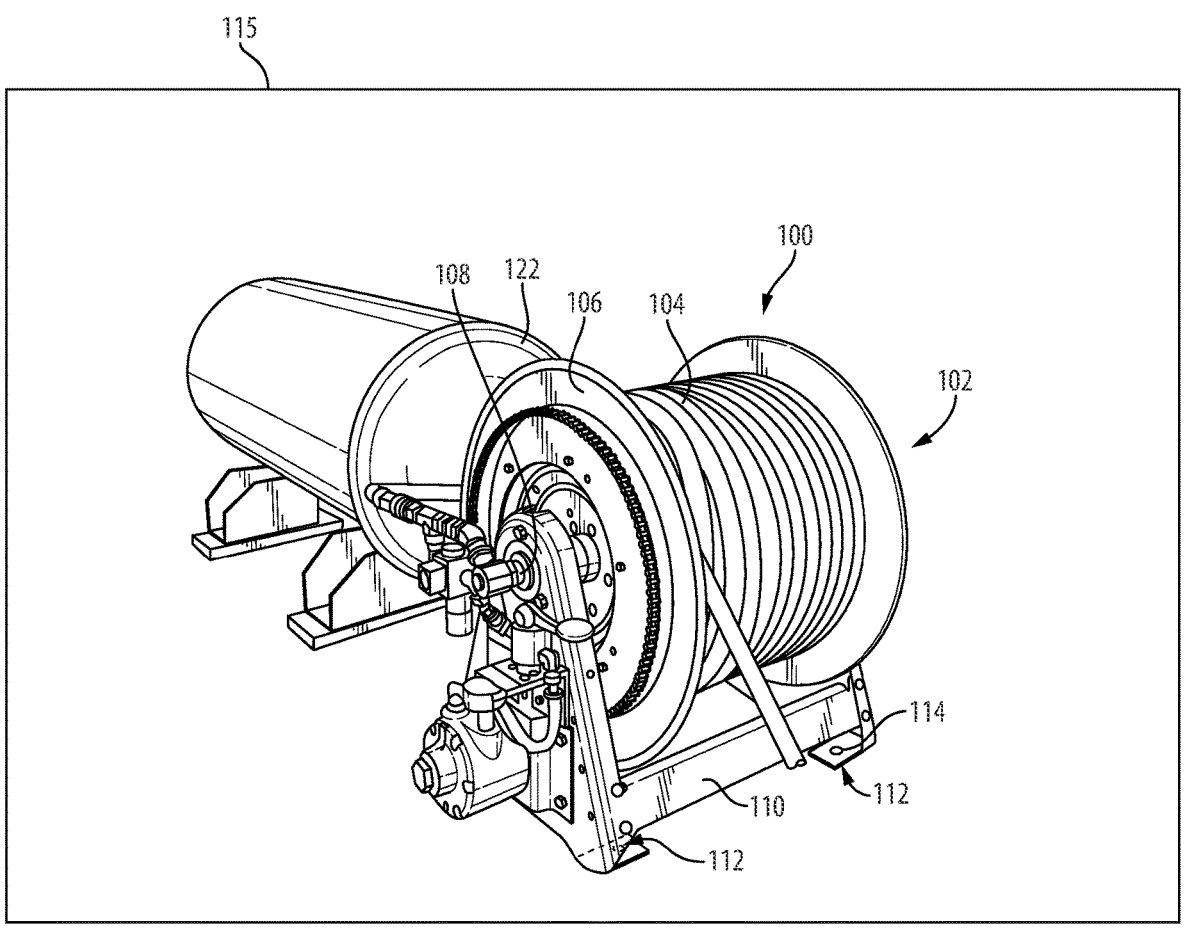
FIG. 1 is a perspective view of a kit in accordance with this disclosure, showing the kit mounted to a structure.
Figure 2:
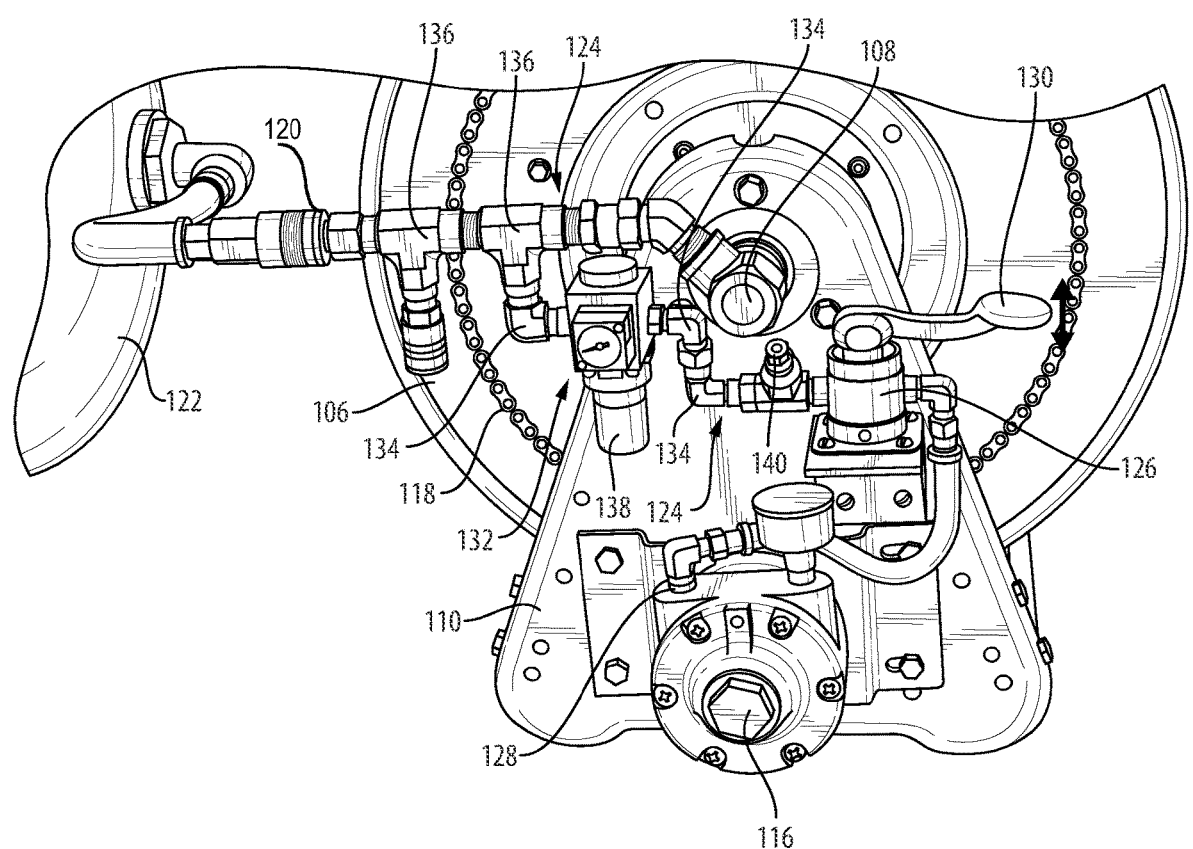
FIG. 2 is a front elevation view of a hose reel system of the kit of FIG. 1.

Reference will now be made to the drawings wherein like reference numerals identify similar structural features or aspects of the subject disclosure. For purposes of explanation and illustration, and not limitation, an illustrative view of an embodiment of a kit in accordance with the disclosure is shown in FIG. 1 and is designated generally by reference character 100. Other embodiments and/or aspects of this disclosure are shown in FIG. 2. Certain embodiments described herein can be used to automatically reel a hose by activating a switch on the reel.

In accordance with at least one aspect of this disclosure, a kit 100 can include a retractable, air driven hose reel system 102 and a hose 104 wound around the reel system 102. In embodiments, the air driven hose reel system 102 can include the retractable hose reel system 102 as described further herein below. In certain embodiments, the kit 100 can include about 200 feet to about 600 feet of hose 104 and the hose 104 can have an inner diameter of about 0.25 inches to about 1 inch. In certain embodiments, the kit 100 can include about 300 feet of hose 104 and the hose 104 can have an inner diameter of about 0.5 inches.

The retractable hose reel system 102 can include a reel 106 configured to rotate about a shaft 108. In embodiments, the system 102 can include a reel frame 110, where the reel 106 is attached to the frame 110 via the shaft 108. The frame 110 can include one or more mounting apertures 112 configured to accept a respective mounting fastener 114 to mount the reel system 102 to a vehicle 115 or a structure 115 via the frame 110.

A fluid driven motor 116 is operatively connected to the reel 106 (e.g., via a motor shaft and one or more gears engaging a chain 118) configured to drive the reel 106 with movement of the motor shaft. A fluid connector 120 can be configured to connect to a fluid source 122 to power the fluid motor 116 via a fluid line 124 connecting between the fluid connector 120 and the fluid motor 116 to supply fluid from the fluid source 122 to the fluid motor 116 to power the fluid motor 116. A valve 126 can be disposed in the fluid line 124 (e.g., at or near an inlet 128 of the motor 116), configured to move between an open position and a closed position. In the open position, the valve 126 allows fluid flow to the fluid motor 116 and in the closed position the valve 126 prevents fluid flow to the fluid motor 116.

An activator switch 130 can be operatively connected to the valve 126 such that the valve 126 is controlled by actuation of the activator switch 130. In certain embodiments, the activator switch 130 can be a manual control switch configured to be actuated by a user. For example, a user can press the activation switch 130 when needed, and upon actuation of the switch 130 the valve 126 can move to the open position, supplying fluid to the fluid motor 116, and driving the reel 106 to rewind the hose 104 onto the reel 106. The fluid line 124 can be configured to provide fluid flow from the fluid source 122 up to the valve 126 upon connection of the fluid connector 124 to the fluid source 122 regardless of the status of the activator switch 130, for example so that fluid is always in the line 124 when the fluid connector 120 is connected to the fluid source 122. In certain embodiments, the fluid connector 120 can include a quick connect connector (e.g., as shown), where once the connector 124 is connected to the fluid source 122, fluid can be immediately available in the hose 104 or at the motor 116.

In embodiments, the fluid source 122 can be configured to supply fluid to both the hose 104 itself and the fluid motor 116. To account for the differing pressures needed by each component, a pressure reducing valve 132 can be disposed in the fluid line 124 upstream of the fluid motor 116 and the valve 126 configured to reduce a pressure of the fluid in the fluid line 124 at the fluid motor 116. The fluid line 124 can include one or more elbow 134 and/or T connectors 136 and one of the T connectors 136 can be configured to split flow in the fluid line 124 upstream of the pressure reducing valve 132 to provide unreduced pressure flow to the hose 104 (e.g., through the shaft 108) while providing reduced pressure to the fluid motor 116 (e.g., through the valve 126). Thus, when the hose 104 is unreeled and in use, full pressure fluid can be expelled from an outlet of the hose 104, while upon activation of the switch 130, reduced pressure fluid is supplied to the motor 116 so as not to damage or blow out the fluid motor 116 and to prevent the motor 116 from reeling the reel 106 too quickly. In embodiments, the pressure reducing valve 132 can include a variable valve configured to be adjusted by the user via an adjustment knob 138.

In certain embodiments, a second T connector 136 can be included in the fluid line 124 between the fluid connector 120 and the pressure reducing valve 132, upstream of the first T connector 136, configured to connect one or more additional retractable hose reel systems 100 to the fluid line 124. When connected, the additional hose reel systems 100 can each be supplied with fluid via the same fluid source 122 as the hose reel system 100, and powered in the same or a similar manner. Each of the hose reel systems 100 connected to the fluid source can all be the same or can be similar. For example, each hose reel system 100 connected to the fluid source 122 can have the same amount of hose 104 with the same inner diameter, or in embodiments, the hose reel systems 100 can individually include varying hose lengths and inner diameters, as needed or desired for a given job site.

In certain embodiments, the fluid motor 116 can include an air motor and the fluid supply 122 can include a supply of compressed air. In certain embodiments, the air motor 116 can be entirely air driven (e.g., without hydraulics or hydraulic fluid) and the system can be entirely mechanically operated (e.g. where there is/are no electrical connections or operation). A lubrication port 140 can be disposed in the fluid line 124 downstream of the pressure reducing valve 132 configured to provide lubricating fluid to one or more of the valve 126 and/or the fluid motor 116.

Embodiments include an air operated hose reel. The hose reel can use the same fluid to operate the reel that is used to supply the hose with fluid. Embodiments provide for full pressure fluid at the outlet of the hose connected to the reel, while provided a reduced pressure fluid at the reel motor to rewind the hose using only a single source of fluid. Embodiments include a hose reel that can operate faster and physically easier than conventional reels (e.g., hand operated reels). Embodiments can be much simpler than a hydraulic reel or electrically operated (e.g., electro pneumatic) reel due to reduced number of components and connections. Embodiments only require a quick connect connector to connect to a fluid supply (e.g., compressed air tank) for fluid to be supplied to the hose and ready for use at the reel motor. Upon activation of a single manual switch, the fluid will power the motor to wind the hose on the reel.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A retractable hose reel system, comprising:
    a reel configured to rotate about a shaft to wind a hose around the reel;
    a fluid driven motor configured to drive the reel;
    a fluid connector configured to connect to a fluid source to power the fluid motor and supply fluid to the hose;
    a fluid line connecting between the fluid connector and the fluid motor to supply fluid from the fluid source to the fluid motor to power the fluid motor; and
    a pressure reducing valve disposed in the fluid line upstream of the fluid motor configured to reduce a pressure of the fluid in the fluid line at the fluid motor;
    a valve disposed in the fluid line configured to move between an open position and a closed position, wherein in the open position the valve allows fluid flow to the fluid motor, and wherein the closed position the valve prevents fluid flow to the fluid motor;
    a lubrication port disposed in the fluid line downstream of the pressure reducing valve configured to provide lubricating fluid to one or more of the valve and/or the fluid motor.

2. The system of claim 1, further comprising an activator switch, wherein the valve position is controlled by actuation of the activator switch.

3. The system of claim 2, wherein the activator switch is a manual control switch configured to be actuated by a user.

4. The system of claim 2, wherein the fluid line is configured to provide fluid flow from the fluid source up to the valve upon connection of the fluid connector to the fluid source regardless of the status of the activator switch.

5. The system of claim 4, wherein the fluid connector includes a quick connect connector.

6. The system of claim 1, wherein the fluid line further comprises one or more elbow and T connectors.

7. The system of claim 6, wherein one of the T connectors is configured to split flow in the fluid line upstream of the pressure reducing valve to provide unreduced pressure flow to a hose while providing reduced pressure to the fluid motor.

8. The system of claim 6, wherein one of the T connectors is disposed in the fluid line configured to connect one or more additional retractable hose reel systems to the fluid line such that all retractable hose reel systems are powered by the fluid source.

9. The system of claim 1, wherein the fluid motor includes an air motor.

10. The system of claim 9, wherein the air motor is entirely air driven.

11. The system of claim 1, wherein the system is entirely mechanically operated such that the system does not include any electrical connection and is not electrically operated.

12. The system of claim 1, further comprising a reel frame, the reel is attached to the frame via the shaft, wherein the reel frame includes one or more mounting apertures configured to accept a respective mounting fastener to mount the reel frame to a vehicle.

13. The system of claim 1, further comprising a reel frame, the reel is attached to the frame via the shaft, wherein the reel frame includes further includes one or more mounting apertures configured to accept a respective mounting fastener to mount the reel frame to a structure.

14. A kit comprising:
    the retractable hose reel system of claim 1; and
    a hose wound around the reel.

15. The kit of claim 14, wherein the kit includes about 200 to about 600 feet of hose, wherein the hose has an inner diameter of about 0.25 inches to about 1 inch.

16. The kit of claim 15, wherein the kit includes about 300 feet of hose, wherein the hose has an inner diameter of about 0.5 inches.

17. The kit of claim 14, wherein the kit is configured to be mounted to a structure.

18. The kit of claim 14, wherein the kit is configured to be mounted to a vehicle.

* * * * *